C. L. DURHAM.
BLOW-OUT PATCH AND HOLDER THEREFOR.
APPLICATION FILED OCT. 7, 1919.
1,369,410.
Patented Feb. 22, 1921.
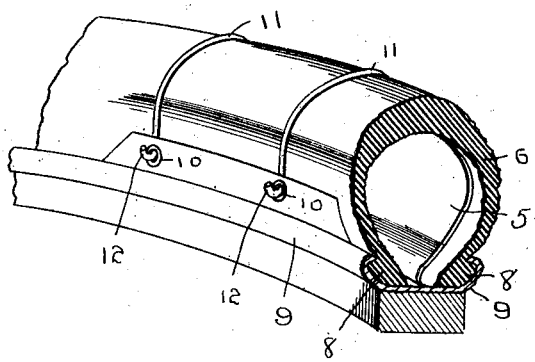
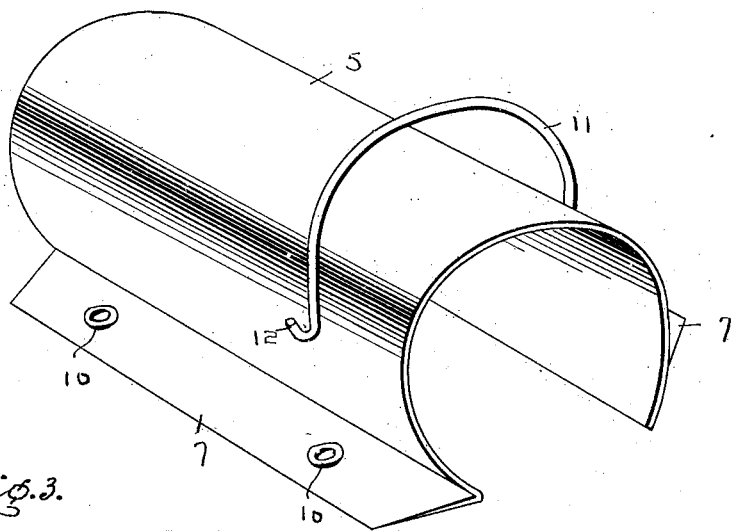
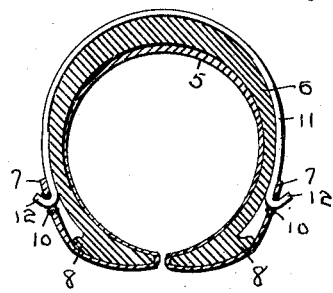
Inventor
C. L. Durham.
By Geo. P. Kimmel
Attorney

UNITED STATES PATENT OFFICE.

CHARLES LE ROY DURHAM, OF KANSAS CITY, MISSOURI.

BLOW-OUT PATCH AND HOLDER THEREFOR.

1,369,410.　　　　　Specification of Letters Patent.　　Patented Feb. 22, 1921.

Application filed October 7, 1919. Serial No. 328,973.

*To all whom it may concern:*

Be it known that I, CHARLES LE ROY DURHAM, a citizen of the United States, residing at Kansas City, in the county of Jackson and State of Missouri, have invented certain new and useful Improvements in Blow-Out Patches and Holders Therefor, of which the following is a specification.

This invention relates to improvements in blowout patches for casings of pneumatic tires of the type disclosed in my prior application filed January 6, 1919, Serial No. 269,809.

The present invention has for its object to provide the side flaps of the internal blowout patch with reinforcing eyelets adapted to receive holding means whereby the flaps are maintained in proper position against the exterior of the side walls of the casing during application of the latter to the wheel rim, thereby obviating possibility of the flaps or patch becoming displaced and affording the operator free use of both hands in applying the tire.

Another object is the provision of an extremely simple and efficient holder for engagement with the eyelets in maintaining the flaps in position which may be swiftly and conveniently applied or removed from the tire and which is capable of economical manufacture from single short strands of common wire.

With these and other objects in view as will appear as the description proceeds the invention comprises the novel features of construction, combination of elements and arrangement of parts which will be more fully described in the following specification and set forth with particularity in the claims appended hereto.

Figure 1 represents a fragmentary perspective view of a section of a pneumatic tire and rim illustrating the improved patch and holder applied thereto.

Fig. 2 represents an enlarged perspective view of the patch removed from a tire casing, illustrating one of the holding devices therefor.

Fig. 3 is a sectional view through the tire showing the invention applied to use.

Referring to the drawing in detail, wherein similar reference numerals designate corresponding parts throughout the several views, the numeral 5 indicates the body of the patch which is preferably of the specific construction disclosed in my prior application above referred to and is of such size as to snugly fit within the size of tire casing 6 in connection with which it is to be used. The longitudinal edges of the body of the patch are formed with flexible side flaps 7 which, when the patch is properly applied to the casing 6, extend between the beads 8 and the edges of the wheel rim 9 and lie in facial abutment with the exterior or the side walls of the casing 6.

In applying blowout patches of this character to pneumatic tire casings, difficulty is invariably encountered in maintaining the patch in proper position with relation to the puncture or blowout in the casing during appliction of the latter to the wheel rim 9. The flaps 7 frequently become folded back beneath the clencher portions of the rim rendering the patch insecure and inffficient in use and often during the operation of applying the casing to the rim the patch accidentally moves to a position entirely remote from the blowout or other weak point in the casing and thus defeats the objects of the patch.

To overcome these difficulties in applying the casing to use I provide the side flaps 7 with metallic reinforced eyelets 10 which lie against the outer surface of the walls of the casing 6 and are adapted to receive adequate bails or fasteners which are extended across the tread portion of the casing to maintain the patch in position thereon.

A preferred type of bail or holder which is particularly desirable due to its simplicity and economy of construction and convenience of application is illustrated in the accompanying drawing and comprises a substantially U-shaped body 11 of substantially semi-cicular form but the shape of which may be varied to adapt it for use in connection with various types of tire casings, according to the shape thereof. The terminals of the body are directed outwardly as at 12 reversely and obliquely to the terminal portions of the body for engagement in the eyelets 10 to maintian the patch in position upon a tire.

From the foregoing, it is evident that the application of the metallic eyelets to the flaps of the blowout patch in combination with the holders 10 provides adequate means for maintaining the patch in a predetermined position with relation to the casing during application of the latter to the wheel rim. Obviously, for convenience in applying and removing the holders from the patch, the pneumatic tire is preferably in a deflated condition permitting collapse thereof and more convenient manipulation of the holders.

What I claim is:

1. An interior patch for pneumatic tires having a body, flexible side flaps carried by the body and adapted to extend beyond and overlie the side walls of a tire casing, and reinforced eyelets carried by said flaps for receiving a device adapted to retain the patch in position upon the casing during application of the latter to a wheel rim.

2. In combination, an internal patch for pneumatic tires including a body, flexible side flaps carried by the body adapted to overlie the side walls of a tire casing, reinforced eyelets carried by the flaps, and holders adapted to embrace a tire casing and having hooked terminals engageable in the eyelets for maintaining the patch in position upon the casing during application of the latter to a wheel rim.

In testimony whereof I affix my signature hereto.

CHARLES LE ROY DURHAM